METAL SLUG RESONATOR

Filed Feb. 3, 1948 2 Sheets-Sheet 1

Inventor
Ben R. Gossick
By Morris O. Rabkin
Attorney

Inventor
Ben R. Gossick
By Morris A. Rabkin
Attorney

Patented July 17, 1951 2,560,946

UNITED STATES PATENT OFFICE 2,560,946

METAL SLUG RESONATOR

Ben R. Gossick, Oak Ridge, Tenn., assignor to Radio Corporation of America, a corporation of Delaware Application February 3, 1948, Serial No. 6,046

9 Claims. (Cl. 178—44)

This invention relates to a novel slug "resonator" comprising only a homogeneous piece of metal, or a composite piece comprising sections of two different metals, which under certain conditions has electrical properties analogous to those of a conventional inductance-capacitance resonant circuit.

The resonator of the present invention has utility in various electrical circuit applications. It may be used as a cheap, indestructible and small frequency indicator, for example. It also has utility as means for controlling the bandwidth of a radio frequency coupling circuit. While its electrical properties may be represented as the equivalent of a series tuned resonator, it differs from conventional resonant circuits in that it has no capacitor and no induction coil. Nor is its resonant frequency a function of its length as is the case in the well-known standing wave resonators. While its size does to some extent affect its resonant frequency, its physical dimensions are so small with respect to the wavelength that the standing wave concept is inapplicable.

It is, therefore, the primary object of this invention to provide a novel circuit element having electrical properties analogous to those of a conventional resonant circuit, but having none of its physical properties.

It is a further object of this invention to provide a slug resonator whose physical dimensions are very small with respect to the wavelength of resonance.

A further object of this invention is to provide a resonant circuit element comprising a solid homogeneous piece of metal.

A further object of this invention is to provide a novel bandwidth control element for radio frequency coupling circuits.

A still further object is to provide an electrical absorption element comprising a metallic slug which exhibits properties analogous to electrical resonance at a given frequency when subject to an electrical alternating field.

A characteristic of a resonant circuit is that at the frequency of resonance the circuit has a purely resistive impedance, at frequencies above resonance its impedance contains a reactive term having a negative sign, while at frequencies below resonance its impedance contains a reactive term having a positive sign. So also, it has been found that when a piece of metal is placed in the field of a coil, or a system of coils, the incremental change of impedance $\Delta Z_0$ produced on a coil due to the presence of the metal is such that for frequencies less than the frequency of resonance of the metal the phase angle $\theta$ of $\Delta Z_0$ is greater than zero, that is, it has a positive sign and its vector lies in the first or third quadrants, while for frequencies greater than the frequency of resonance the phase angle of $\Delta Z_0$ is less than zero, that is, it has a negative sign and its vector lies in the second or fourth quadrants. In a copending application Serial No. 742,672, filed April 19, 1947, by Ben R. Gossick, now abandoned, a system is described and claimed which employs two metal slugs to introduce quadrature voltages into a balanced bridge network for the purpose of eliminating the inherent residual unbalance voltage.

It is well known that when comminuted ferromagnetic material is moulded in an insulating binder and placed in the field of a coil, it will effectively increase the inductance of the coil. A tuning core of this type is commonly known as a "powdered iron core." This increase is due to the fact that the phase angle $\Delta Z_0$ for such material is +90°, which is the same as the phase angle of a reactor having negligible resistance. It is also known that this phase angle is substantially invariable over a wide range of frequencies. A powdered iron core has, of course, high magnetic permeability and extremely low conductivity. It is also known that conductive, non-magnetic metal, such as copper, in the field of a coil tends to reduce its inductance, and the phase angle of $\Delta Z_0$ is therefore negative, and approaches −90 as the conductivity of the metal approaches infinity. It has now been discovered that the incremental impedance $\Delta Z_0$ of metals and alloys having characteristics of both permeance and conductance will have a negative phase angle at relatively high frequencies, a positive phase angle at relatively low frequencies, and at some intermediate frequency the phase angle will be zero since the reactive components will be equal and opposite. This intermediate frequency may, therefore, be considered as the resonant frequency of the piece of metal. When the metal is placed in the magnetic field of a coil or system of coils energized at that frequency, the change of impedance produced by its introduction will be equivalent to that produced by inserting a resistor in the coil circuit, or placing a series resonant circuit of the conventional variety in its field. Otherwise stated, the coupled impedance of the slug has a unity power factor.

It is, therefore, a further object of this invention to provide an electrical absorption element comprising a metallic slug having equal and opposite reactance components at a given frequency of resonance solely by virtue of its permeance and conductance.

The novel features that are considered characteristic of this invention are set forth with particularity in the appended claims. The invention, both as to its organization and method of operation, as well as additional objects and advantages thereof, will best be understood from the following description when read in connection with the accompanying drawings, in which Figs. 1, 2 and 3 are views of three forms of metallic slug resonators;

Figure 1:
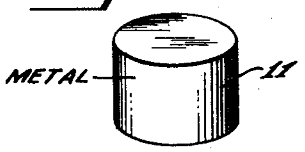

Referring now to Fig. 1, there is shown a metallic slug resonator 11 of cylindrical shape. This may consist of a metal selected to meet the requirements, or of an alloy of two or more metals. The term "slug" is intended to cover a homogeneous or composite piece of metal of any shape or size within the limits to be described below.

Figure 2:
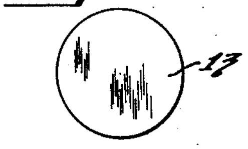
Figure 3:
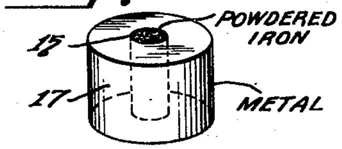

Fig. 2 illustrates a spherical slug 13, while Fig. 3 illustrates a composite slug consisting, for example, of a central section 15 of powdered iron and an outer annular section 17 of metal.

Two methods may be employed in the design of a slug resonator for a given purpose. The first is an empirical method in which a number of samples of different metal are made up into identical forms and measurements made of their electrical properties. The other is by the application of equations which will be derived hereinafter. When $\Delta Z_0$ and $\theta$ are measured for a slug of known composition and of a given shape, the equations will permit calculation of $\Delta Z_0$ and $\theta$ for slugs of the same shape having different size or different electrical properties.

Since the invention is concerned with the change of impedance $\Delta Z_0$ produced by a given piece of metal when brought into the field of a coil, and the phase angle $\theta$ of this change, a method of measuring these values will first be described.

Connect a coil of known inductance $L_0$ to a conventional "Q" meter and determine the capacity $C_0$ required to resonate the coil at frequency F and the Q factor $Q_0$. Then insert the slug to be tested within the coil and obtain the new capacity C' and new Q factor Q' at the same frequency F.

The Q factor is defined as the inductive reactance divided by the resistance. In the first instance, therefore:

$$Q_0=\frac{\omega L_0}{R_0}$$

or $$\frac{\omega L_0}{Q_0}=R_0 \qquad (1)$$

Since $Q_0$ and $L_0$ are known, $R_0$ can be determined.

It is also evident that at resonance $$\frac{1}{\omega C_0}=\omega L_0 \qquad (2)$$

and when the slug is in the coil $$\frac{1}{\omega C'}=\omega(L_0+\Delta L_0) \qquad (3)$$

where $\Delta L_0$ is the change in inductance due to the presence of the slug.

From (3) $\omega\Delta L_0$ can be determined since C' and $L_0$ are known. When the slug is in the coil (1) becomes $$\frac{\omega(L_0+\Delta L_0)}{Q'}=R_0+\Delta R_0 \qquad (4)$$

from which $\Delta R_0$ can be determined. It is also evident that $$\Delta Z_0=\Delta R_0+j\omega\Delta L_0=[(\Delta R_0)^2+(\omega\Delta L_0)^2]^{1/2} \qquad (5)$$

while the phase angle $\theta$ of this impedance is $$\theta=\tan^{-1}\frac{\omega\Delta L_0}{\Delta R_0} \qquad (6)$$

which can readily be determined.

Figure 4:
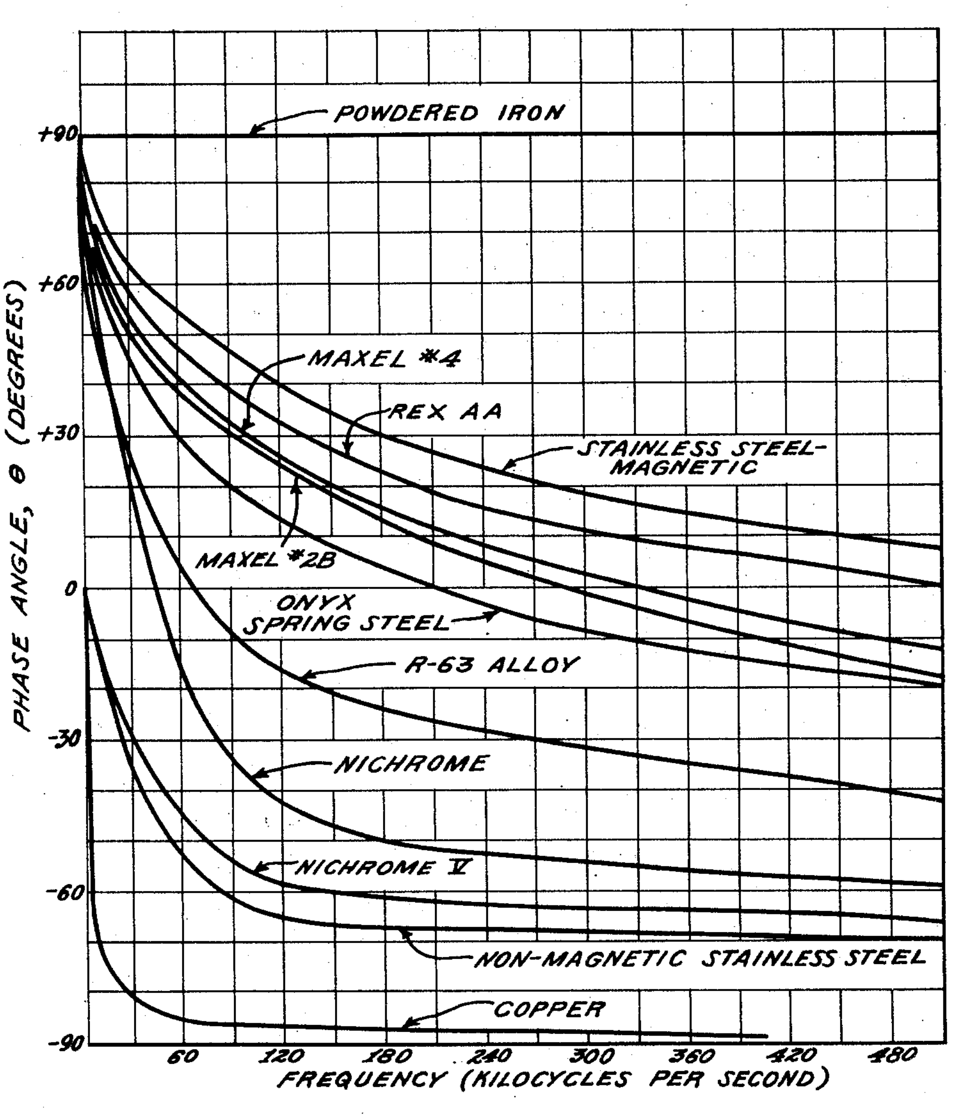
Fig. 4 is a series of curves illustrating the electrical properties of various metals and alloys.

Referring to Fig. 4, a number of curves are shown representing the phase angle $\theta$ as a function of frequency for a number of slugs of identical size and shape, but of different composition, the data being taken with the different slugs identically placed inside a given coil.

It should be noted that the phase angle for a representative sample of powdered iron of the type commonly used in radio frequency circuits is constant at +90° within a degree over a range of frequencies from 10 kc. to 500 kc. The phase angles of other metals, however, vary with frequency.

Magnetic stainless steel approaches +90° at very low frequencies, and approaches 0° at frequencies higher than those shown in Fig. 4. However, this curve will cross the 0° axis at a sufficiently high frequency. Onyx spring steel begins at +90° at low frequencies and crosses the 0° axis at 210 kc. R-63 alloy crosses the axis at about 70 kc. Nichrome crosses at 45 kc. while non-magnetic stainless steel and copper have negative phase angles for all values of frequency.

The frequency of resonance for the slug considered may be defined as the frequency Fr corresponding to the point of zero phase angle. Thus at the frequency indicated in each case, a slug of the composition stated and in the form of a ⅜ inch diameter ½ inch long cylinder will react on a certain coil exactly as will a series resonant circuit coupled to the coil, and is equivalent to the insertion of a pure resistance in series with the coil $L_0$. This is because at this frequency the reactive components reflected into the coil are equal and opposite.

Many other metal slugs of the same shape have been tested, although all the curves have not been shown. However, the table contains a more complete list of various metals, it being understood that the data applies to slugs ⅝ inch in diameter and ½ inch long.

TABLE

| | Metal | Per Cent Chemical Analysis | Fr | Average Value of δ Below Fr | Resistivity, ρ, Microhm-CM at 20° C. |
|---|---|---|---|---|---|
| 1 | Powdered Iron in Insulating Binder | | | | |
| 2 | Stainless Steel (Magnetic) FM-2, Type 416 | C=0.15; Mn=1.25; Si=1.00; $P_4$=0.04; $S_8$=0.07; Cr=12-14; Mo=0.60; Bal.=Fe | above 500 kc. | $-.53/10^5$ | 60 |
| 3 | Airdi Steel | C=1.50; Cr=11.5; V=.20; Mo=.80; Bal=Fe | 520 kc | $-.56/10^5$ | 60 |
| 4 | Rex AA Steel | W—18; V=1.1; Cr=4; Bal=Fe | 520 kc | $-.51/10^5$ | 24 |
| 5 | Maxel No. 4 Steel | C=.75; Cr=.50; Mn=.85; Bal=Fe | 340 | $-.78/10^5$ | 13-22 |
| 6 | Ketos Steel | C=.90; W=.50; Mn=1.25; Cr=.50; Bal=Fe | 290 kc | $-.96/10^5$ | 13-22 |
| 7 | Maxel No. 2B Steel | C=.40; Si=.30; Cr=.22; Mn=1.09; Ni=.37; Mo=.15 | 290 kc | $-.88/10^5$ | 13-22 |
| 8 | Onyx Spring Steel | C=.95; Bal=Fe | 210 kc | $-1.25/10^5$ | 13-22 |
| 9 | R-63 Alloy | Mn=4; Si=1; Bal=Ni | 70 kc | $-3.3/10^5$ | 25 |
| 10 | Nichrome | Ni=61; Cr=15; Bal=Fe | 45 kc | | 112 |
| 11 | Nichrome V | Ni=80; Cr=20 | | | 108 |
| 12 | Non-Magnetic Stainless Steel FM 18-8, Type 303 | Cr=17-19; Ni=7-9; Bal=Fe | | | 91 |
| 13 | Brass | Cu=66; Zn=34 | | | 6.72 |
| 14 | Aluminum | Al≈100 | | | 2.824 |
| 15 | Copper | Cu≈100 | | | 1.724 |

Figure 5:
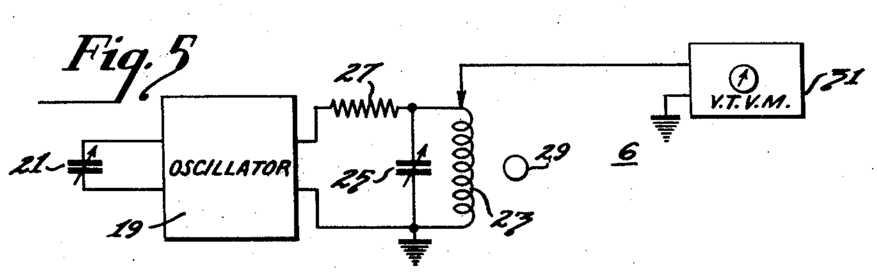
Fig. 5 is a circuit diagram illustrating the use of a slug resonator as a wavemeter.

One use of a resonant slug is illustrated in Fig. 5. Oscillator 19, whose frequency may be varied by a tuning element such as capacitor 21, includes an output circuit including capacitor 25 and coil 23, the latter of which may be coupled to any utilization circuit, not shown. The output circuit is so coupled to the oscillator that its resonant frequency does not affect the frequency of oscillation. Resistor 27 represents the internal impedance of the source.

The frequency of oscillation may be adjusted to a predetermined standard frequency by means of slug 29. Vacuum tube voltmeter (V. T. V. M.) 31 is coupled to coil 23. Capacitor 25 is tuned to produce the peak value of voltage. Slug 29 is then brought within the field of coil 23 and capacitor 25 again tuned to the peak voltage as indicated by the V. T. V. M. If the capacity at peak output is the same with and without the slug, the oscillator is tuned to the resonant frequency of the slug. If, however, the slug detunes the output tank circuit, the frequency of oscillator 19 is then adjusted one way or the other and the process repeated until the capacity at peak output is the same with and without the slug. The same result may be achieved by bringing the slug into the field of the oscillator coil itself, and noting the frequency change produced by the slug, if any, by any suitable frequency responsive device such as a receiver or beat frequency oscillator.

It is probable that this method of measuring frequency will not be as accurate as some other methods. But where great accuracy is not required the extreme simplicity of the system has many advantages. The resonant slug is small and practically indestructible. It is not subject to breakdown or failure of any sort, as are conventional frequency indicators of the heterodyne type.

Figure 6:
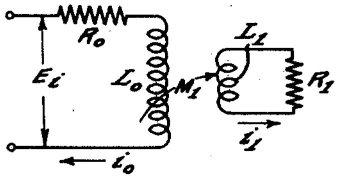
Fig. 6 is a circuit diagram of the equivalent circuit of a non-magnetic slug in the field of a single coil.

Fig. 6 illustrates the equivalent electrical circuit of a non-magnetic metal slug in the field of coil $L_0$, energized by voltage $E_i$. The change of impedance $\Delta Z_0$ in the coil $L_0$ produced by the metal is $$\Delta Z_0=\frac{(\omega M_1)^2}{R_1+j\omega L_1}=\frac{\omega^2 k^2 L_0 L_1}{R_1+j\omega L_1} \quad (7)$$

where $M_1$ is the mutual inductance and $k^2$ is the coefficient of coupling. Equation 7 has been given by C. B. Kirkpatrick in an article published in the "Wireless Engineer," vol. XX, No. 239 for August 1943 and by G. H. Brown in an article, "Efficicency of inductance heating coils" published in the August 1944 "Electronics."

The incremental inductance $\Delta L_0$ produced on the same coil by a powdered iron tuning slug is $$\Delta L_0=K_1(\mu-1)L_0 \quad (8)$$

while the incremental impedance $\Delta Z_0$ due to the same powdered iron element is $$\Delta Z_0=j\omega\Delta L_0=j\omega K_1(\mu-1)L_0 \quad (9)$$

where $K_1$ is a constant which will be shown later to have the properties of a coefficient of coupling, and $\mu$ is the initial permeability of the iron.

With the small order of magnetizing forces normally encountered in most electronic applications only the initial value of permeability is used. The value of $\mu$ may therefore be assumed to be approximately constant. Neglecting non-linearity for the reason stated, Equations 7 and 9 may be added by the principle of superposition to yield $\Delta Z_0$ for a ferrous metal with appreciable conductivity, or a composite slug of the type illustrated in Fig. 3 having separable components of magnetic and non-magnetic metals.

Thus $$\Delta Z_0=\frac{(\omega M_1)^2}{R_1+j\omega L_1}+j\omega K_1(\mu-1)L_0=\frac{\omega^2k^2L_0L_1}{R_1+j\omega L_1}+j\omega K_1(\mu-1)L_0 \qquad (10)$$

and therefore the angle $\theta$ of the incremental impedance is $$\theta=\tan^{-1}\frac{(\mu-1)(R_1^2+\omega^2L_1^2)^{K_1/k^2}-\omega^2L_1^2}{\omega L_1R_1} \qquad (11)$$

When a metal slug is moved near coil $L_0$ so that only $K_1$ and $k^2$ vary, it may be shown experimentally that $\theta$ is constant. Therefore $$k_1^2\propto K_1 \qquad (12)$$

Examples of experiments which establish the validity of Equation 12 are as follows:

(1) A metal sphere with small linear dimensions compared to those of coil $L_0$ is always in an approximately uniform field when held in the region of the coil. The value of $\mu$ is constant, while $L_1$ and $R_1$ are constant by symmetry. Thus, when the sphere is moved in the region of the coil, only $K_1$ and $k^2$ vary.

(2) If an irregularly shaped piece of metal which is small compared to the linear dimensions of the coil is moved so that the angle between the direction of flux and a line passing through two points in the piece of metal is constant, $R_1$ and $L_1$ will then be constant. As before, $\mu$ is also constant. Therefore only $K_1$ and $k^2$ vary. From Equations 11 and 12 the generalization may be drawn that when the metal slug moves so that the same field distribution is maintained around it, the angle $\theta$ will be constant.

A further experiment has been made which leads to the conclusion that $K_1=k^2$. Place a given slug having permeability greater than unity, and which is therefore represented by Equation 10 in closely coupled relation with coil $L_0$ so that $K_1$ and $k^2$ approach their maximum values of unity. Then the constant of proportionality relating $K_1$ and $k^2$ (see Equation 12) must also approach unity. Measure $\theta$. Then remove the slug and place it outside the coil $L_0$ in a position such that the same field distribution is maintained around it, and remeasure $\theta$. The values of $\theta$ obtained by the two measurements will be found to be identical. Thus we may conclude that $K_1=k^2$, and (10) and (11) may be rewritten as $$\Delta Z_0=\frac{\omega^2k^2L_0L_1}{R_1+j\omega L_1}+j\omega k^2(\mu-1)L_0 \qquad (13)$$

and $$\theta=\tan^{-1}\frac{(\mu-1)(R_1^2+\omega^2L_1^2)-\omega^2L_1^2}{\omega L_1R_1} \qquad (14)$$

If we now let $$k=\frac{M_2}{\sqrt{(\mu-1)L_0L_1}} \qquad (15)$$

and a hysteresis component $R_2$ is included in the second term of Equation 13, that term yields to dimensional analysis and also becomes more accurate. In this manner (13) is rewritten as $$\Delta Z_0=\frac{(\omega M_1)^2}{R_1+j\omega L_1}+\frac{(\omega M_2)^2}{R_2-j\omega L_1}=\omega^2k^2L_0L_1\left[\frac{1}{R_1+j\omega L_1}+\frac{(\mu-1)}{R_2-j\omega L_1}\right] \qquad (16)$$

It should be noted that inductance $L_1$ appears in both terms of Equation 16. The same value of inductance $L_1$ is assigned in the second term as is assigned in the first term because both terms represent the same physical dimensions, and the quantity or value of inductance here is chiefly a function of physical dimensions. This may be regarded as an arbitrary matter of convenience because when (16) is rewritten as $$\Delta Z_0=\omega k^2L_0\left[\frac{\omega L_1}{R_1+j\omega L_1}+\frac{(\mu-1)\omega L_1}{R_2-j\omega L_1}\right] \qquad (17)$$

it may be seen that the magnitude of the second term depends only on the ratio of $\omega L_1$ to $R_2$.

Figure 7:
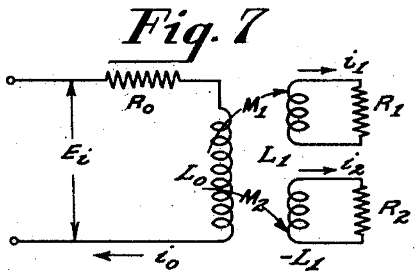
Fig. 7 is a circuit diagram of the equivalent circuit of a slug resonator in the field of a coil.

Equation 16 is identical to that which may be obtained from the solution of the circuit equations for the circuit illustrated in Fig. 7, which is the equivalent circuit diagram of a metal slug in the field of coil $L_0$ where the conducting properties of the slug are represented by $M_1$, $L_1$ and $R_1$, and the magnetic properties are considered separately in terms of $M_2$, $-L_1$ and $R_2$, as illustrated.

The statement made above, based upon experimental evidence, that metals having properties of permeance and conductance will, at a given frequency, behave like a series resonant L-C circuit can be verified from Equation 16.

It may also be noted here that Equation 16 is general. For instance, in the case of copper, $\mu\rightarrow1$, so that the second term disappears, and with a powdered iron core $R_1\rightarrow\infty$, so that the first term disappears.

As is the case for any steady state impedance, it is understood that the constants in the foregoing equations are to be taken as A. C. values. For a given shape these values are dependent upon the size, specific resistivity $\rho$, initial permeability $\mu$ and frequency $$\frac{\omega}{2\pi}$$

Methods of extrapolating approximations sufficiently close for design purposes will now be shown for determining the $\Delta Z_0$ and $\theta$ of a selected metal slug based upon measurements of a slug of a different metal of the same shape, but not necessarily of the same size.

In the case of the constants representing inductance and permeability, it is assumed that they do not change appreciably with changes in frequency. The validity of this assumption as to the constancy of the inductance may be verified by almost any publication on the subject. The validity of the constancy of permeability may be verified, for example, by the article of Foster and Newlon, "Measurement of iron cores at radio frequencies," Proceedings of the I. R. E., May 1941, at page 271.

Now by regarding Levy's two theorems (Proceedings of the I. R. E., June 1936, vol. 24, No. 6, beginning at page 940) as special cases of a more general relationship, and working backwards, it may be shown that $\Delta Z_0$ falls within the range $$\omega k^2 K_2 L_0\left[\frac{\omega K_2^2 L_1}{\rho K_3+j\omega K_2^2 L_1}+j(\mu-1)\right]<\Delta Z_0<\omega k^2 K_2 L_0\left[\frac{\omega K_2 L_1}{K_4\sqrt{\rho\mu\omega}+j\omega K_2 L_1}+j(\mu-1)\right] \quad (18)$$

Where $K_2$ is a common factor of all linear dimensions in the system, $K_3$ and $K_4$ are constants for any given shape.

The term on the right in Equation 18 describes the effect where current flow is confined to the "skin thickness" (which is proportional to $$\sqrt{\frac{\rho}{\mu\omega}})$$

where skin thickness is small compared to the linear dimensions of the slug. The term on the left in (18) describes the effect of constant current density throughout the slug. From the particular dimensions and electrical constants of a given slug it is possible to estimate how closely $\Delta Z_0$ will approach the term on the right of (18). In the range of frequencies from 10 to 500 k. c., for example, for magnetic steels and good conductors such as brass, copper and aluminum, the skin thickness for slugs of practical size is so small that $\Delta Z_0$ may be considered as equal to the right hand term of Equation 18.

From the right hand term of (18) the phase angle $\theta$ is $$\theta=\tan^{-1}\frac{(\mu-1)(\rho\mu\omega K_4^2+\omega^2 K_2^2 L_1^2)-\omega^2 K_2^2 L_1^2}{\omega K_2 L_1 K_4\sqrt{\rho\mu\omega}} \quad (19)$$

PROBLEM I

The use of Equation 19 is illustrated in the following problem. Having determined by measurement $\Delta Z_0$ and $\theta$ of a slug of non-ferrous metal of given shape and size it is desired to determine the corresponding values of a ferrous metal slug of the same shape and size.

*Solution I*

For the non-ferrous slug, let $\rho$, the scalar value of $\Delta Z_0$ and $\theta$ be given by $\rho_0$, $\Delta Z_{0-0}$ and $\theta_0$, respectively. For the ferrous metal let $\rho$, the initial permeability $\mu$, the vector value of $\Delta Z_0$ and $\theta$ be given by $\rho_1$, $\mu_1$, $\Delta Z_{0-1}$ and $\theta_1$, respectively. Let $$\psi=\tan^{-1}\frac{K_2 L_1\sqrt{\omega}}{K_4\sqrt{\rho\mu}} \quad (20)$$

Substituting (20) in the right hand term of (18) gives $$\Delta Z_0=\omega k^2 L_0 K_2\,[\sin\psi\,(\cos\psi-j\sin\psi)+j(\mu-1)] \quad (21)$$

Let the particular value of $\psi$ for the ferrous metal be $\psi_1$. Then, from (20), this value is determined to be $$\psi_1=\tan^{-1}\left(\frac{\sqrt{\rho_0}\tan\theta_0}{\sqrt{\rho_1\mu_1}}\right) \quad (22)$$

As in this case $K_2$ is unity, the common factor of (21), ($\omega k^2 L_0$) is from (16)

$$\frac{\Delta Z_{0-0}}{\sin\theta_0}=\omega k^2 L_0 \quad (23)$$

The answer is then $$\Delta Z_{0-1}=\frac{\Delta Z_{0-0}}{\sin\theta_0}[\sin\psi_1(\cos\psi_1-j\sin\psi_1)+j(\mu_1-1)] \quad (24)$$

and $$\theta_1=\tan^{-1}\frac{\mu_1-\sin^2\psi_1-1}{\sin\psi_1\cos\psi_1} \quad (25)$$

PROBLEM II

Assuming that the frequency employed in Problem I is $$\frac{\omega_0}{2\pi}$$

determine $\Delta Z_0$ and $\theta$ for the ferrous slug at a different frequency $$\frac{\omega_1}{2\pi}$$

where the orientation of the slug with respect to the coil $L_0$ is the same as before.

*Solution II*

Let the values of $\Delta Z_0$, $\theta$, and $\psi$ for the ferrous slug at frequency $$\frac{\omega_1}{2\pi}$$

be represented by $\Delta Z_{0-2}$, $\theta_2$ and $\psi_2$ respectively.

From (20) $\psi_2$ is determined as $$\psi_2=\tan^{-1}\frac{\sqrt{\rho_0\omega_1}\tan\theta_0}{\sqrt{\rho_1\omega_0\mu_1}} \quad (26)$$

In this case the common factor of (21) is $$\frac{\omega_1\Delta Z_{0-0}}{\omega_0\sin\theta_0}=\omega_2 k^2 L_0 \quad (27)$$

Substituting (26) and (27) in (21), we have $$\Delta Z_{0-2}=\frac{\omega_1\Delta Z_{0-0}}{\omega_0\sin\theta_0}[\sin\psi_2(\cos\psi_2-j\sin\psi_2)+j(\mu_1-1)] \quad (28)$$

and $$\theta_2=\tan^{-1}\frac{\mu_1-\sin^2\psi_2-1}{\sin\psi_2\cos\psi_2} \quad (29)$$

PROBLEM III

Consider a coil $L_0$ and a ferrous slug having the same relative dimensions and orientation as in Problems I and II except that all dimensions are $m$ times greater. The specific resistivity, initial permeability of the ferrous metal slug, the number of turns of coil $L_0$ and the frequency are all the same as in Problem II. Determine $\Delta Z_0$ and $\theta_0$ for the particular conditions.

*Solution III*

Let the particular values of $\Delta Z_0$, $\theta$ and $\psi$ be denoted by $\Delta Z_{0-3}$, $\theta_3$ and $\psi_3$, respectively.

From (20), and as $K_2=m$ $$\psi_3=\frac{m\sqrt{\rho_0\omega_1}\tan\theta_0}{\sqrt{\rho_1\omega_0\mu_1}} \quad (30)$$

The common factor of (21) is given by $$K_2\omega k^2 L_0=\frac{m\omega_1\Delta Z_{0-0}}{\omega_0\sin\theta_0} \quad (31)$$

Then substituting (30) and (31) in (21)

$$\Delta Z_{0-3}=\frac{m\omega_1\Delta Z_{0-0}}{\omega_0\sin\theta_0}[\sin\psi_3(\cos\psi_3-j\sin\psi_3)+j(\mu-1)] \quad (32)$$

and $$\theta_3=\tan^{-1}\frac{\mu_1-\sin^2\psi_3-1}{\sin\psi_3\cos\psi_3} \quad (33)$$

By making $\mu=1$ in the solutions to Problems I, II and III, the values of $\Delta Z_0$ and $\theta_0$ are obtained for a non-ferrous slug whose resistivity is $\rho_1$.

In the derivation of the approximations given above it has been assumed that permeability and inductance are approximately constant with changes in frequency. This assumption implies that $$\Delta\mu=\delta\Delta\omega \quad (34)$$

and $$\Delta L=\epsilon\Delta\omega \quad (35)$$

where $\delta$ and $\epsilon$ are infinitesimals. Over the frequency ranges normally encountered, these approximations are reasonably accurate. For extended ranges, that is, where $\Delta\omega$ is very large, it may be desirable to measure $\mu$ or L at the desired operating frequency. Measured average values of $\delta$ for the various metals are listed in the table. These values may be used to correct $\mu$ by Equation 34.

Figure 8:
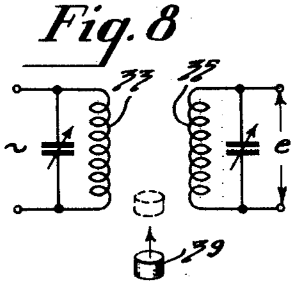
Figs. 8 and 10 illustrate alternate forms of the invention.
Figure 9:
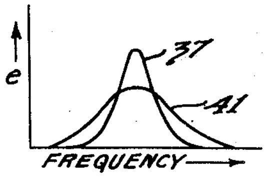
Fig. 9 is a graph illustrating the effect of a resonant slug on the Q of a resonant circuit.

A further embodiment of the present invention is in the control of the Q of a resonant circuit. A fixed frequency coupling transformer of the type commonly employed in intermediate frequency amplifiers is illustrated in Fig. 8 with a resonant slug 39 in a position relatively remote from the coils. Primary coil 33 and secondary coil 35 are tuned to the intermediate frequency and, say, critically coupled to produce a high Q resonance characteristic as shown by curve 37 of Fig. 9.

Figure 10:
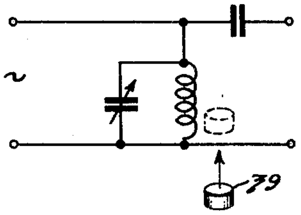

Slug 39 is then moved to a position relatively close to one or both of the coils. Since the slug is designed to have no reactive effect on the coils at the operating frequency, their resonant frequency is not changed. However, losses are introduced into the circuit so that the effective Q is lowered to produce a resonance characteristic as shown by curve 41 of Fig. 9. The bandwidth of a coupled circuit may therefore be varied without changing its resonant frequency. A similar effect can be produced by moving a resonant slug with respect to a single coil coupling network of the type illustrated in Fig. 10. The Q of any tuned circuit may similarly be controlled.

The composite core of the type illustrated in Fig. 3 has certain advantages. In an article entitled "Compressed powdered molybdenum permalloy for high quality inductance coils" written by V. E. Legg and F. J. Given and published in the Bell System Technical Journal, vol. 29, July 1940, it has been shown that by a controlled mixture of different iron powders, the temperature coefficient of permeability may be made either positive or negative. By this means the temperature coefficient of the conductor 17 can be compensated so that the resonant frequency of a composite slug will be independent of temperature. Such construction is preferred where the slug is a frequency determining element, as, for example, in the application described above in connection with Fig. 5.

What is claimed is:

1. An electrical circuit element comprising a tuning inductance providing substantially a uniform electrical alternating field, and a relatively small metallic slug having equal and opposite reactance components in said field at a given resonant frequency by virtue of its permeance and conductance.

2. The combination with a tuning inductance coil adapted to be energized by an alternating voltage so as to produce an electromagnetic field and a capacitor tuning said coil to resonance at a predetermined frequency, of an effective circuit element movably positioned in said field, said circuit element comprising a body of material having properties of permeance and conductance of such values that the coupled impedance of said element has a unity power factor and being of relatively small size with respect to said field, whereby the Q of said coil is determined by the proximity of said circuit element.

3. The combination with an air core transformer having primary and secondary coils in mutually coupled relation providing substantially a uniform field therebetween and tuned to a predetermined frequency of operation, of a metallic tuning element comprising a body of material having properties of permeance and conductance located in said field and being of relatively small size with respect thereto, the relative values of which permeance and conductance at said predetermined frequency are such that the coupled impedance of said element has a unity power factor.

4. A variable bandwidth radio frequency coupling device comprising primary and secondary coils in mutually coupled relation, means tuning said coils to resonance at a predetermined operating frequency, a metallic tuning element movably positioned in the magnetic field coupling said coils and being in the form of a unitary body of relatively small size with respect to said field, said element having electrical properties of permeance and conductance so proportioned that the coupled impedance of said element has a unity power factor, the coupling between said coils being adjusted to critical coupling when said element is in a position relatively remote from said coils.

5. A variable bandwidth radio frequency coupling device including as an element thereof an inductance coil and a tuning capacitor in parallel therewith, and a metallic element comprising a unitary body of material movably positioned in the field of said coil and being of relatively small size with respect thereto, said element having electrical properties of permeance and conductance so proportioned and balanced that the coupled impedance of said element has a unity power factor.

6. The combination with a source of oscillatory currents and a coil energized thereby of a metallic tuning member of a relatively small size compared to the linear dimension of said coil, said member being positioned in the magnetic field of said coil and having properties of permeance and conductance of such values that the impedance of said element which is coupled to said coil at a given frequency has a unity power factor.

7. The combination described in claim 6 in which said member is a homogeneous alloy of at least two metals.

8. The combination described in claim 6 in which said member consists of a composite structure of a comminuted ferro-magnetic material and a non-magnetic metal.

9. The combination with a source of oscillatory currents and a coil energized thereby of a metallic tuning member of relatively small size compared to the linear dimension of said coil, said member having properties of permeance and conductance of such values that the impedance of said element which is coupled to said coil at a given frequency has a unity power factor, said member being movable with respect to said coil within said coil field to vary the Q of said coil at said given frequency.

BEN R. GOSSICK.

REFERENCES CITED

The following references are of record in the file of this patent:

UNITED STATES PATENTS

| Number | Name | Date |
|---|---|---|
| 2,153,622 | Jacobs | Apr. 11, 1939 |
| 2,248,470 | Spoor | July 8, 1941 |
| 2,251,631 | Mayer | Aug. 5, 1941 |